United States Patent
Nakajima et al.

[11] Patent Number: 6,155,710
[45] Date of Patent: Dec. 5, 2000

[54] METHOD AND DEVICE FOR PRODUCING EMULSIONS

[75] Inventors: Mitsutoshi Nakajima; Yuji Kikuchi, both of Ibaraki; Takahiro Kawakatsu, Miyagi, all of Japan

[73] Assignee: Japan, as represented by Director of National Food Research Institute, Ministry of Agriculture, Forestry and Fisheries, Ibaraki, Japan

[21] Appl. No.: 09/125,403
[22] PCT Filed: Nov. 28, 1996
[86] PCT No.: PCT/JP96/03492
§ 371 Date: Aug. 18, 1998
§ 102(e) Date: Aug. 18, 1998
[87] PCT Pub. No.: WO97/30783
PCT Pub. Date: Aug. 28, 1997

[30] Foreign Application Priority Data

Feb. 20, 1996 [JP] Japan .................................. 8-031882

[51] Int. Cl.[7] .................. B01F 15/02; B01F 5/04
[52] U.S. Cl. .................... 366/167.1; 366/176.1
[58] Field of Search ................... 366/348, 143, 366/167.1, 173.1, 173.2, 176.2, 176.1; 242/314, 306; 137/559

[56] References Cited

U.S. PATENT DOCUMENTS

| | | | |
|---|---|---|---|
| 2,504,678 | 4/1950 | Gardner | 366/176.2 |
| 4,201,691 | 5/1980 | Asher et al. | 252/314 |
| 4,352,573 | 10/1982 | Pandolfe | 366/176.2 |
| 4,534,388 | 8/1985 | Pall et al. | |
| 4,664,528 | 5/1987 | Rodgers et al. | 366/143 |
| 4,755,325 | 7/1988 | Osgerby | 366/176.2 |

FOREIGN PATENT DOCUMENTS

| | | |
|---|---|---|
| 54-116389 | 9/1979 | Japan . |
| 60-5223 | 1/1985 | Japan . |
| 2-95433 | 4/1990 | Japan . |
| 5-220382 | 8/1993 | Japan . |
| 6-71150 | 3/1994 | Japan . |
| 6315617 | 11/1994 | Japan . |

OTHER PUBLICATIONS

Science of Emulsion, Shaman, Asakura Shoten (Tokyo), 1971, Principles of Emulsion E.S.R. Gopal, Department of Physics, Indian Institute of Science, Bangalore.

Biochimica et Biophysica Acta, 557 (1979) 9–23, Elsevier/North–Holland Biomedical Press, Preparation of Liposomes of Defined Size Distribution by Extrusion Through Polcarbonate Membranes, Olsen et al.

Proceedings of the 28th Autumn Meeting, Chemical Engineering Institute of Japan (1993), Membrane–Emulsifying Process Using a PTFE Membrane and Emulsion Characteristics, Biological Production Department of Hiroshima University, Japan, Kan–ichi Suzuki et al.

Effect of Surfactant on Production of Monodispersed O/W Emulsion in Membrane Emulsification, Nakashima et al., Ind. Res. Inst. of Miyazaki Prefecture, Miyazaki–shi 800, Jun. 19, 1993.

Preparationof Monodispersed O/W Emulsion by Glass Membrane, Nakashima et al. Ind.Res. Inst. of Miyazaki Prefecture, Miyazaki–shi 880, Jun. 19, 1993.

(List continued on next page.)

*Primary Examiner*—Tony G. Soohoo
*Attorney, Agent, or Firm*—Merchant & Gould

[57] ABSTRACT

A dispersed phase (O) supplied inside a bulkhead member (17) through a supply port (14) enters a gap (20) between a plate (16) and a base (18) through a supply port (19) of the base (18) and the dispersed phase (O) having entered the gap (20) then enters a continuous phase (W) through a boundary section (21) by virtue of pressure applied by a pressurizing means such as a pump. Then, the dispersed phase is made into a particle having a predetermined diameter by a microchannel (24) in passing through this boundary section (21), thereby forming an emulsion (E) in which the dispersed phase (O) of the predetermined diameter is dispersed in the continuous phase (W).

4 Claims, 7 Drawing Sheets

OTHER PUBLICATIONS

A Study on Drop Formation in Liquid–Liquid System, Fujinawa et al., Apr. 21, 1957.

Microvascular Research 47, 126–139 (1994), Technical Report, modified Cell–Flow Microchannels in a Single–Crystal Silicon Substrate and Flow Behavior of Blood Cells, Kikuchi et al.

Optically Accessible Microchannels Formed in a Single–Crystal Silicon Substrate for Studies of Blood Rheology, Kikuchi et al., Microvascular Research, vol. 44, No. 2, Sep. 1992, p226–240.

Drop Formation at Low Velocities in Liquid–Liquid Systems, Scheele et al., AlChE Journal, vol. 14, No. 1, pp. 9–15, Jan. 1968.

ized dispersed phase is forced to be sent into a continuous phase through a large number of microchannels with a predetermined width formed on a base, etc.

In the device for producing emulsions of the present invention, a base on which a supply port for a dispersed phase is formed is provided, a gap to which the dispersed phase is supplied is formed between the base and a plate placed opposing the base, a boundary section between the dispersed phase and a continuous phase is formed on a side opposing the plate of the base, a large number of microchannels with a predetermined width are formed in the boundary section, and the dispersed phase is brought into contact with the continuous phase via the microchannel.

The plate opposing the base may be a transparent plate. It enables direct optical observation of channel moving of a dispersed phase and a condition of contact between the dispersed phase and the continuous phase, thereby enabling control of production of emulsions.

The boundary section, in which a large number of microchannels are formed, is provided so as to surround the supply port for the dispersed phase so that emulsions can be produced efficiently.

As a method of forming microchannels, a large number of microchannels with a predetermined width can be formed in any shape on the base by applying an etching process, one of the manufacturing steps of semiconductor integrated circuits.

DESCRIPTION OF SYMBOLS

In these figures, 1 denotes a device for producing emulsions, 2 a dispersed phase tank, 5 a continuous phase tank, 9 an emulsion tank, 11 a body of a device for producing emulsions, 12 a supply port for a continuous phase (W), 14 a supply port for a dispersed phase (O), 15 a collection port for emulsion (E), 16 a plate, 17 a bulkhead member, 18 a base, 19 a supply port for a dispersed phase (O), 20 a gap, 21 a boundary section, 22 a protruded bar, 23 a protrusion, 24 a microchannel, 25 an optical reading device, O a dispersed phase, W a continuous phase, and E emulsion.

BEST MODE FOR CARRYING OUT THE INVENTION

Figure 1:
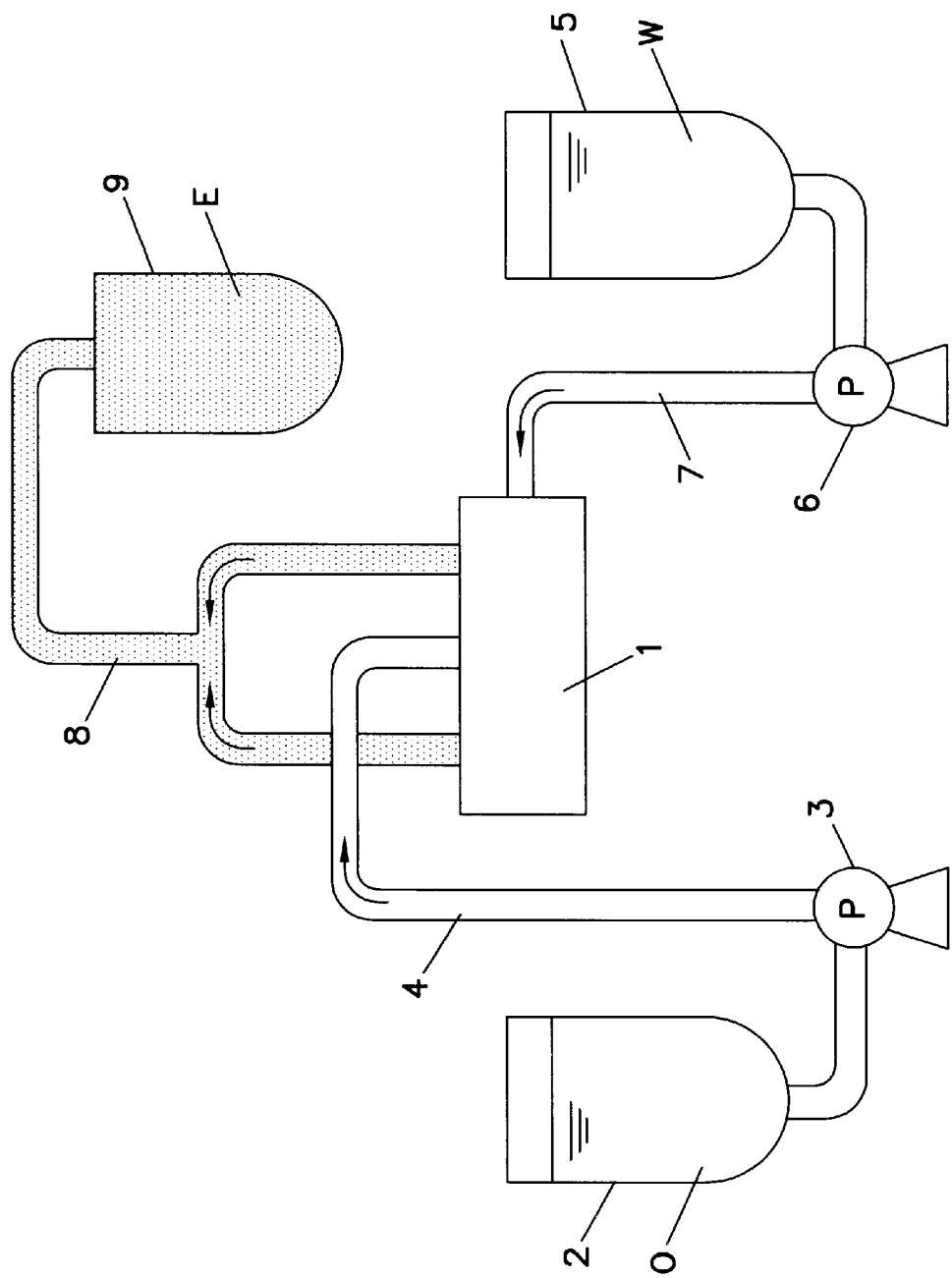
FIG. 1 shows an entire system incorporating the device for producing emulsions according to the present invention.

An embodiment of the present invention is now described referring to the attached figures. FIG. 1 shows an entire

METHOD AND DEVICE FOR PRODUCING EMULSIONS

TECHNICAL FIELD

The present invention relates to a method of producing emulsions used in the food industry, manufacturing of drugs and cosmetics, etc. and to a device implementing the method.

BACKGROUND ART

Techniques in which a biphasic system for which a separated state is thermodynamically stable, such as that composed of a water phase and an organic phase, is emulsified to obtain a semi-stable emulsion have been conventionally known. For general emulsification methods, as described in "Science of Emulsions" (Asakura-shoten, 1971), methods using a mixer, a colloid mill, a homogenizer, etc. and a method of dispersion with a sound wave are known.

These general methods mentioned above have such a disadvantage that diameters of dispersed phase particles in a continuous phase distribute over a wide range.

Then, a method using filtration through a membrane comprising polycarbonate (Biochemica et Biophysica Acta, 557 (1979), North-Holland Biochemical Press); a method using repeated filtrations through a PTFE (polytetrafluoroethylene) membrane (Proceedings of the 26th Autumn Meeting of the Society of Chemical Engineers, Japan, 1993); and a method of manufacturing homogenous emulsions by sending a dispersed phase into a continuous phase through a porous glass membrane with uniform pores (Japanese Patent Application Laid-Open No. 2-95433) have been proposed.

As a method of producing emulsions using a nozzle or a porous plate, a laminar-flow dripping method (KAGAKU K OGAKU vol. 21, No. 4, 1957) is also known.

Among the conventional modified methods mentioned above, the method using filtration through a membrane comprising polycarbonate and the method using repeated filtrations through a PTFE membrane cannot manufacture emulsions of particles larger than membrane pores theoretically or cannot separate particles smaller than membrane pores. These methods are therefore especially unsuitable for producing emulsions of large particles.

Figure 11:
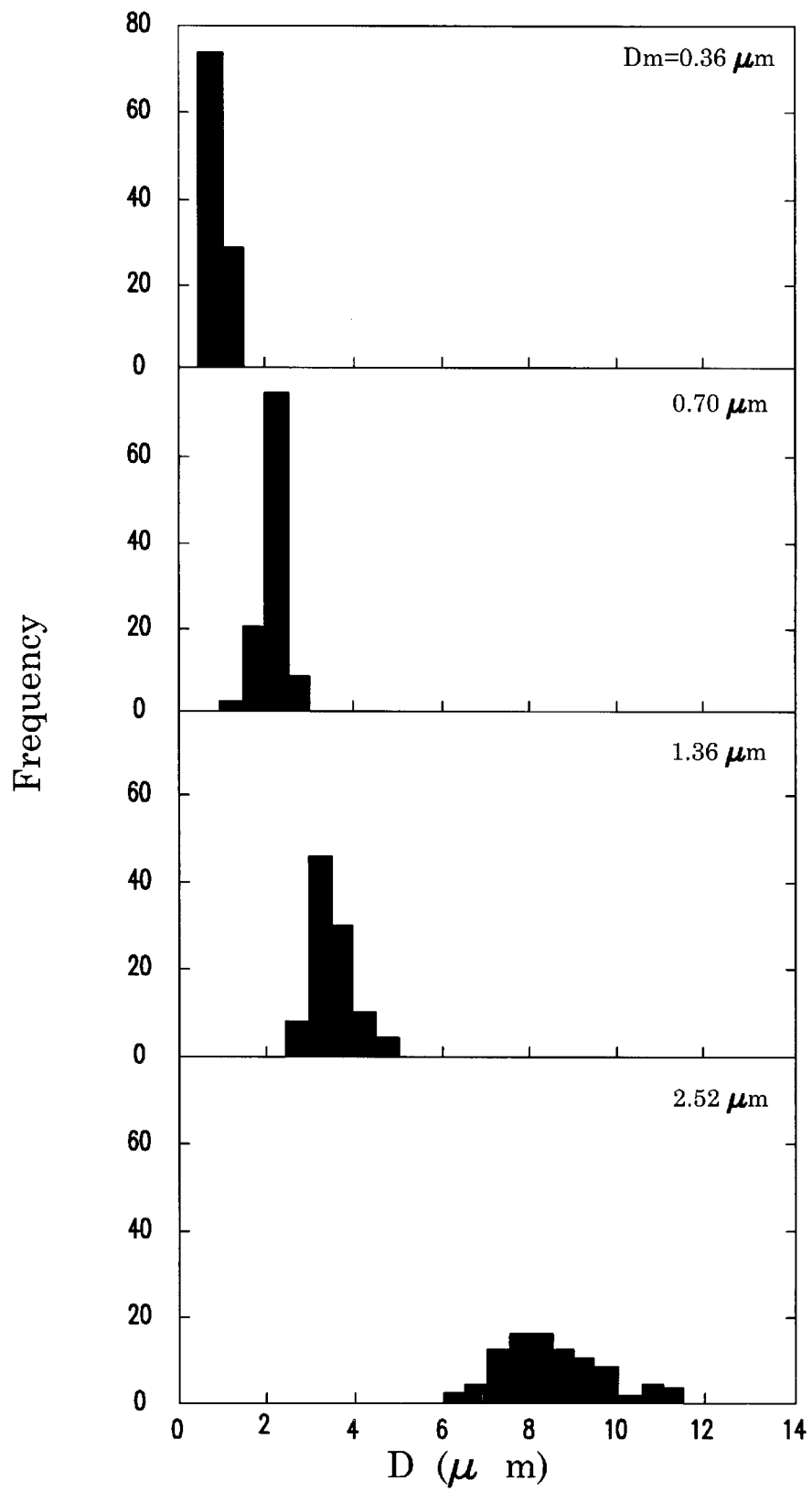
FIG. 11 is a graph showing the relation between average membrane pore diameters and distribution of particle diameters of emulsions in using a conventional device.

In the method using a porous glass membrane with uniform pores, as shown in a graph in FIG. 11, when an average diameter of membrane pores is small, particle diameters distribute in a narrow range and thus homogenous emulsions can be obtained. When an average diameter of membrane pores is increased, however, particle diameters distribute over a wide range so that homogenous emulsions cannot be obtained.

In addition, in the laminar-flow dripping method, particle sizes become 1,000 $\mu$ or more and distribute over a wide range so that homogenous emulsions cannot be obtained.

DISCLOSURE OF THE INVENTION

The present invention aims at solving the above-mentioned problems of prior art and intends to provide a method and a device for efficiently producing homogenous emulsions without broadening a distribution of particle diameters.

In order to achieve this object, according to the method for producing emulsions of the present invention, a pressursystem incorporating the device of producing emulsions according to the present invention. A dispersed phase (O) is supplied from a dispersed phase tank 2 through a pump 3 and a piping 4 to a device for producing emulsions 1 and a continuous phase (W) is supplied from a continuous phase tank 5 through a pump 6 and a piping 7 to the device for producing emulsions 1. An emulsion (E) produced in the device for producing emulsions 1 is stored in an emulsion tank 9 through piping 8.

A pump 6 is shown as a pressurizing means in this example, but other pressurizing means such as a difference in water level can be used.

Figure 2:
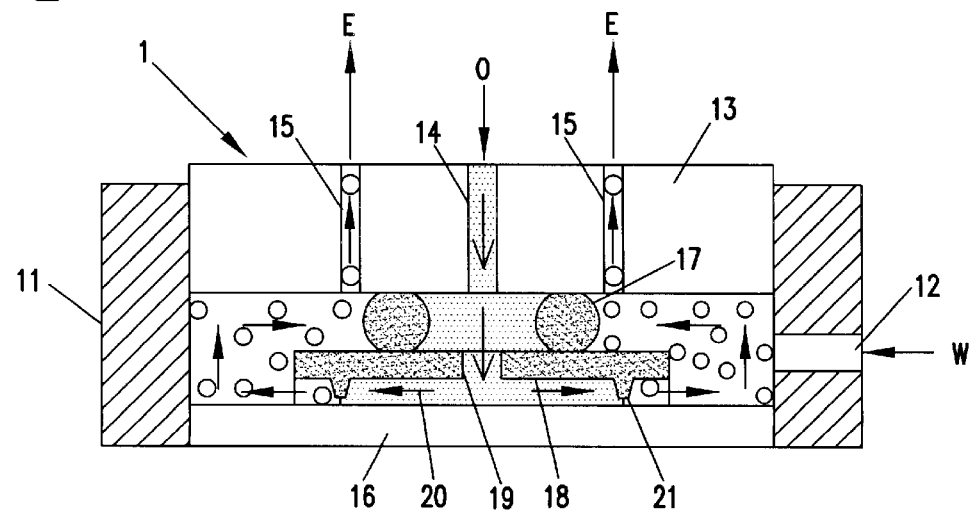
FIG. 2 is a vertical section of the device for producing emulsions.
Figure 3:
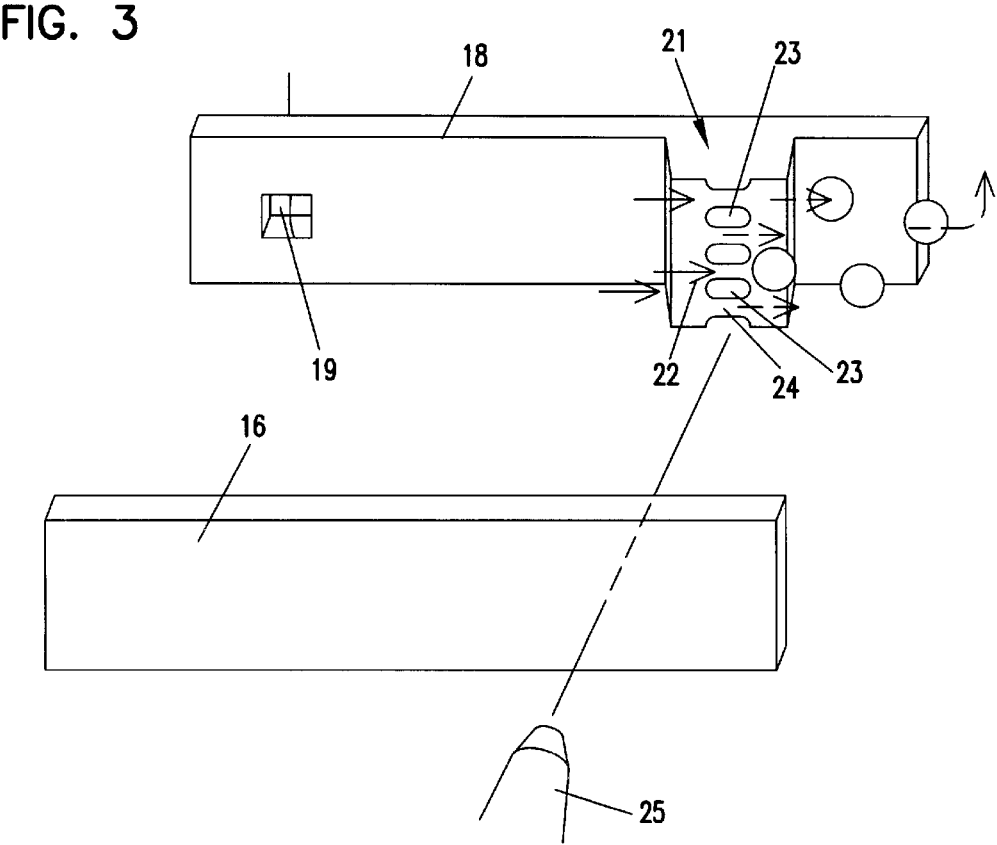
FIG. 3 is an exploded perspective view of the necessary parts of the device for producing emulsions.
Figure 4:
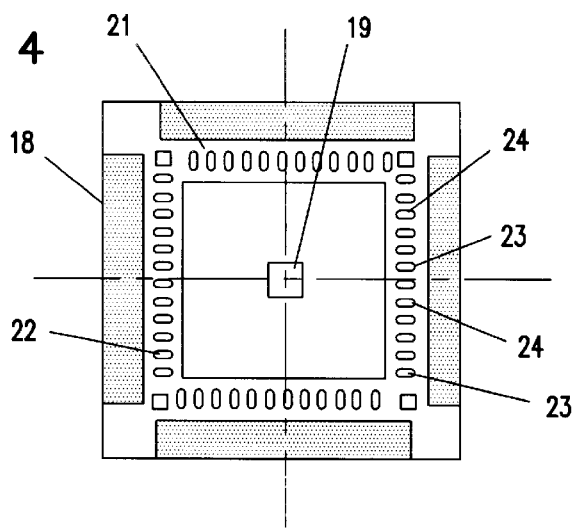
FIG. 4 is a bottom view of a base constituting the device for producing emulsions.
Figure 5:
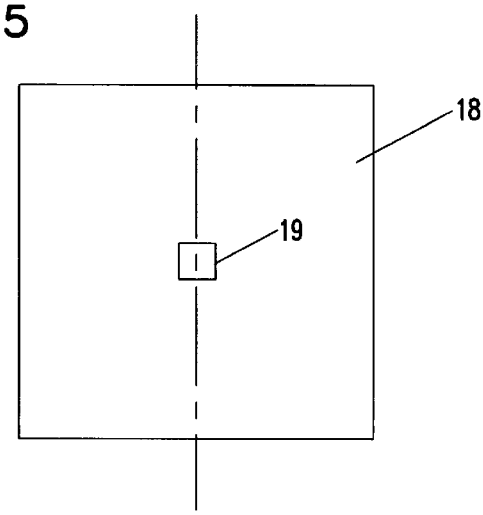
FIG. 5 is a top view of a base constituting the device for producing emulsions.
Figure 6:
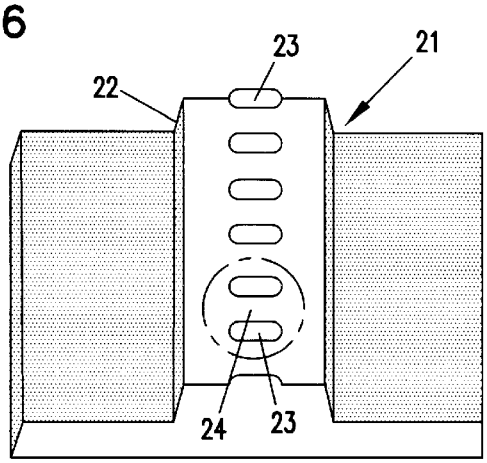
FIG. 6 is an enlarged perspective view of a boundary section formed on the base.
Figure 7:
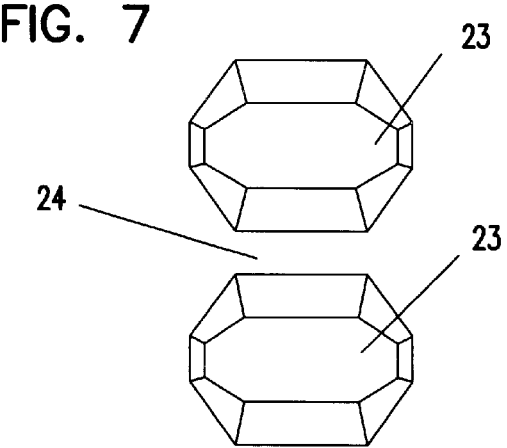
FIG. 7 shows microchannels.

Next, a structure of the device for producing emulsions 1 is explained referring to FIG. 2 to FIG. 7. Here, FIG. 2 is a vertical section of the device for producing emulsions, FIG. 3 is an exploded perspective view of necessary parts of the device for producing emulsions, FIG. 4 is a bottom view of a base constituting the device for producing emulsions, FIG. 5 is a top view of a base constituting the device for producing emulsions, FIG. 6 is an enlarged perspective view of a boundary section formed on the base, and FIG. 7 shows microchannels.

In the device for producing emulsions 1, the supply port 12 for a continuous phase (W) with which the piping 7 connects is formed on a side wall of a body 11, an upper opening of the body 11 is closed with a lid 13, a supply port 14 for a dispersed phase (O) with which the piping 4 connects is formed on the center of the lid 13, and a collection port 15 for emulsion (E) which is connected with the piping 8 is formed at a place apart from the center of the lid 13.

A lower opening of the body 11 is closed with a plate 16 and a base 18 is placed inside the body ll with a bulkhead member 17 such as an O-ring lying between the base and the lid 13. The bulkhead member 17 separates the supply port l4 for the dispersed phase (O) from the collection port 15 for emulsion (E).

In addition, a supply port 19 for a dispersed phase (O) is formed in a center part of the base 18, a gap 20 is formed between the base 18 and the plate 16 placed opposing the base 18, and a boundary section 21 between a dispersed phase (O) and a continuous phase (W) is formed on a side opposing the plate 16 of the base 18.

In the boundary section 21, a protruded bar 22 is formed on the periphery of the base so as to surround the supply port 19 for a dispersed phase (O) rectangularly, a large number of protrusions 23 are formed on the protruded bar 22 with predetermined intervals, and spaces between the protrusions 23, 23 are used as microchannels 24.

The boundary 21 section with these microchannels 24 is formed by wet or dry etching.

In the above, a dispersed phase (O) supplied inside the bulkhead member 17 through the supply port 14 enters a gap 20 between the plate 16 and the base 18 through the supply port 19 of the base 18 and the dispersed phase (O) having entered the gap 20 enters a continuous phase (W) through the boundary section 21 by virtue of pressure applied by a pressurizing means such as a pump. Then, the dispersed phase is made into a particle having a predetermined diameter by a microchannel 24 in passing through the boundary section 21, thereby forming an emulsion (E) in which the dispersed phase (O) of the predetermined diameter is dispersed in the continuous phase (W).

The plate 16 may be a transparent plate such as a glass plate. The use of a transparent plate enables observation from the outside using the optical reading device 25 as shown in FIG. 3 and allows precise control of a rate of producing emulsions accompanying a change in driving pressure.

In addition, a type of emulsion produced can be changed according to a hydrophilic or hydrophobic property of a base. That is, when a hydrophilic base is used, an O/W type emulsion can be produced, and when a hydrophobic base is used, a W/O type emulsion can be produced.

Figure 8:
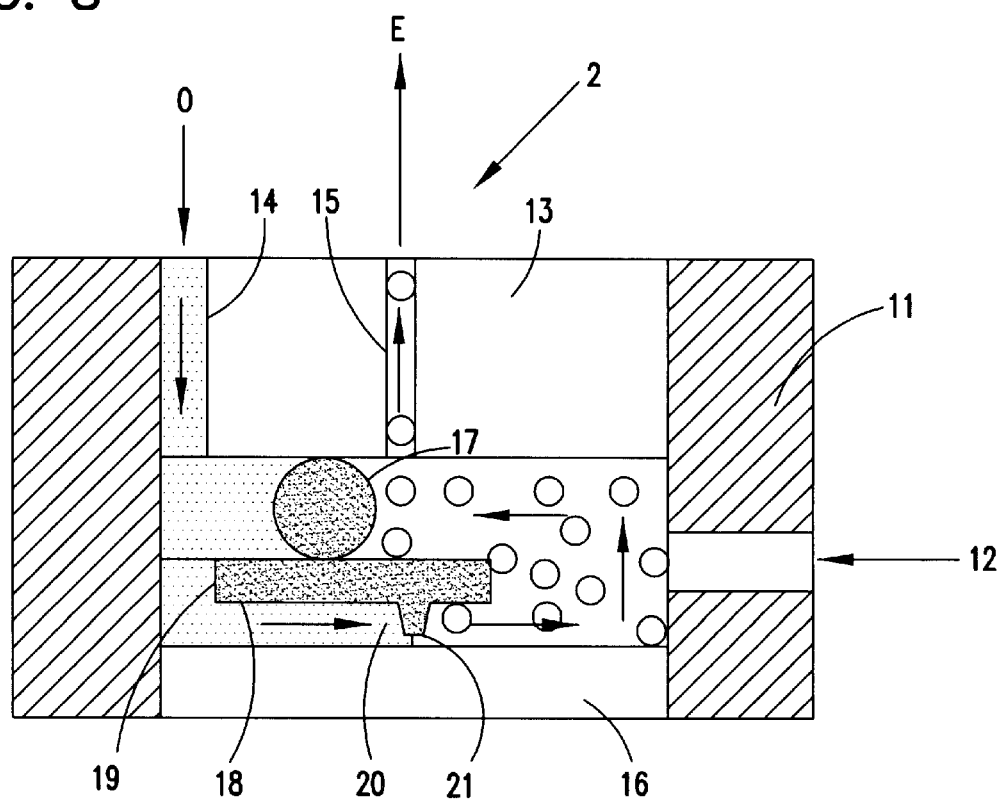
FIG. 8 is a cross sectional view of another example of the device for producing emulsions.
Figure 9A:
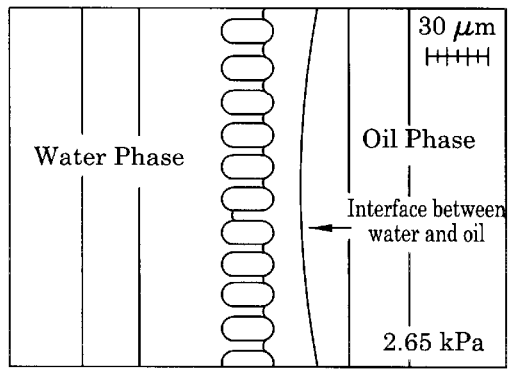
FIGS. 9 (*a*)–(*d*) specifically show fine patterns formed on the base of Example 1 and FIG. 9 (*e*) shows colloids of Example 1.
Figure 9B:
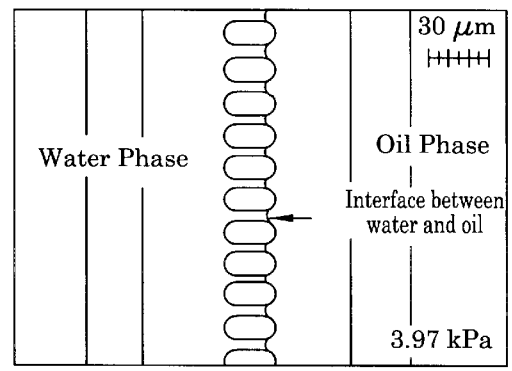
Figure 9C:
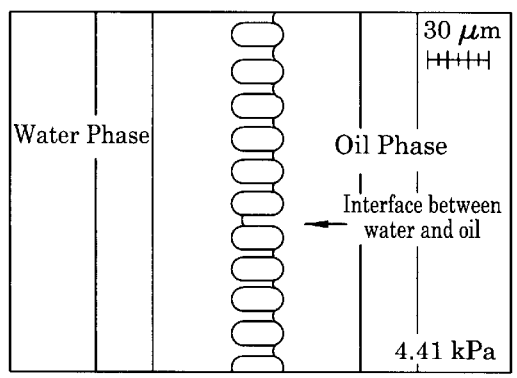
Figure 9D:
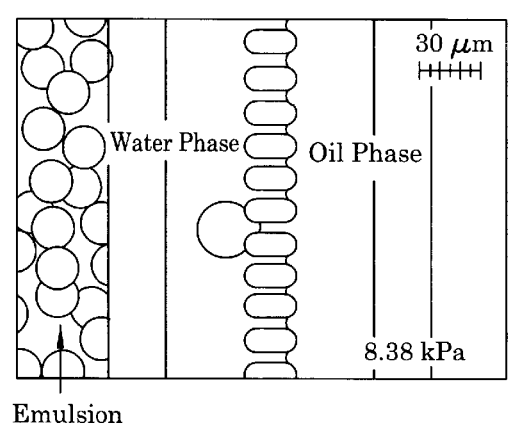
Figure 9E:
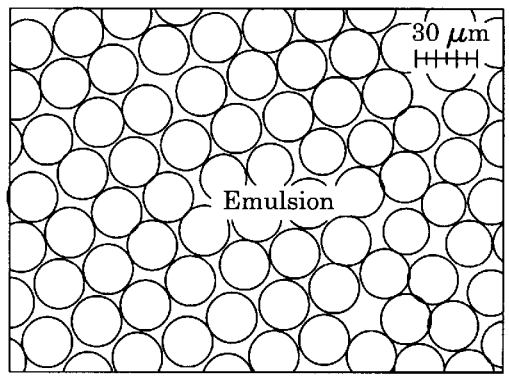

In addition, a constitution of a device for producing emulsions 1 is not restricted to the one described above. For example, as shown in FIG. 8, a device for producing emulsions can have such a structure that a supply port 14 for a dispersed phase (O) is formed on an edge part close to one side of the body 11 of a lid 13 and a collection port 15 for emulsions (E) is formed in almost the center of the lid 13. It is also possible to form a channel in which a dispersed phase (O) flows by sticking two bases in a manner that the sides on which microchannels are formed are opposed.

Specific examples will be described below.

EXAMPLE 1

An emulsion was attempted to be produced using triolein containing 0.3 wt % sorbitan monolaurate as a dispersed phase and water as a continuous phase under driving pressures of 2.65 kPa, 3.97 kPa, 4.41 kPa, and 8.38 kPa. The results are shown in FIGS. 9 (*a*)–(*d*).

FIGS. 9 (*a*)–(*c*) indicate that when a driving pressure is low such as 2.65 kPa, 3.97 kPa, and 4.41 kPa, it is impossible to force a dispersed phase to enter a continuous phase so that an emulsion is not produced. However, it is shown that when a driving pressure is elevated to 8.38 kPa, a dispersed phase is sent into a continuous phase through microchannels as shown in FIG. 9 (*d*). It is observed that the emulsion thus produced is homogenous with a very uniform particle diameter as shown in FIG. 9(*e*).

EXAMPLE 2

Figure 10:
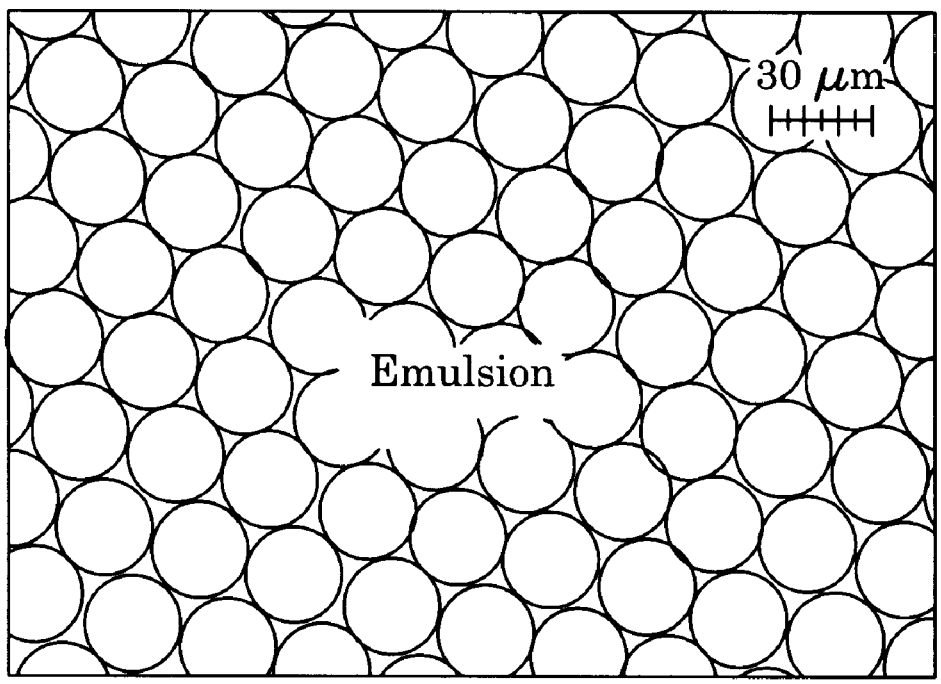
FIG. 10 specifically shows colloids of Example 2.

An emulsion was attempted to be produced using water containing 0.75 wt % KCl as a dispersed phase and kerosene containing 0.3 wt % sorbitan monolaurate as a continuous phase under a driving pressure of 1.62 kPa. The results are shown in FIG. 10. As shown in FIG. 10, a homogenous emulsion with a markedly uniform particle diameter is observed.

As described above, according to the method of producing emulsions of the present invention, since pressurized dispersed phase is forced to be sent into a continuous phase through a large number of microchannels with a predetermined width formed on a base or the like, a distribution of particle diameter does not broaden and homogenous emulsions can be obtained, when dispersed particles have a small diameter, as a matter of course, and even when dispersed particles have a larger diameter.

According to the device for producing emulsions of the present invention, since a base on which a supply port for a dispersed phase is formed is provided, a gap to which the dispersed phase is supplied is formed between the base and a plate placed opposing the base, a boundary section between the dispersed phase and a continuous phase is formed on a side opposing the plate of the base, a large number of microchannels with a predetermined width are formed in the boundary section, and the dispersed phase is brought into contact with the continuous phase via the microchannels, a distribution of particle diameter does not broaden and homogenous emulsions can be efficiently produced.

The use of a transparent plate for a plate opposing a base enables direct optical observation of channel moving of a dispersed phase and a condition of contact between the dispersed phase and a continuous phase, thereby enabling to control production of emulsions.

The provision of a boundary section, in which a large number of microchannels are formed, so as to surround the supply port for a dispersed phase allows further efficient emulsion production.

The adoption of an etching method for forming microchannels allows accurate formation of microchannels in any shape with a predetermined width.

INDUSTRIAL APPLICABILITY

The method and device for producing emulsions according to the present invention can contribute to production of emulsions utilized in the food industry and manufacturing of drugs and cosmetics, etc.

We claim:

1. A device for producing emulsions of a dispersed phase in a continuous phase comprising:

a plate;

a base having a supply port for the dispersed phase and with a protruded bar, said protruded bar contacting said plate to form a gap to which said dispersed phase is supplied through said supply port, said protruded bar forming a boundary section between the dispersed phase and the continuous phase, said protruded bar having a plurality of protrusions forming microchannels in intervals between protrusions;

wherein the dispersed phase is brought into contact with the continuous phase via the micorchannels.

2. The device for producing emulsions according to claim 1, wherein said plate opposes said base and is transparent.

3. The device for producing emulsions according to claim 1, wherein the boundary section in which said microchannels are formed is provided so as to surround the supply port for the dispersed phase.

4. The device for producing emulsions according to claim 1, wherein said microchannels are formed by subjecting the base to a precise processing technique, said technique being one of an etching treatment, irradiation of electron rays, or CVD method.

* * * * *